(12) United States Patent  (10) Patent No.: US 6,290,054 B1
Buechi  (45) Date of Patent: Sep. 18, 2001

(54) STAR FEEDER FOR TRANSFERRING OBJECTS FROM A FIRST CONVEYING MEANS TO SECOND CONVEYING MEANS

(75) Inventor: Robert Buechi, Weinfelden (CH)

(73) Assignee: IPT Weinfelden AG, Weinfelden (CH)

( * ) Notice: Subject to any disclaimer, the term of this patent is extended or adjusted under 35 U.S.C. 154(b) by 0 days.

(21) Appl. No.: 09/156,397

(22) Filed: Sep. 18, 1998

(30) Foreign Application Priority Data

Sep. 18, 1997 (CH) .................................................... 2200/97

(51) Int. Cl.⁷ .................................................. B65G 47/86
(52) U.S. Cl. .................................. 198/473.1; 198/803.11; 198/867.08
(58) Field of Search ........................... 198/473.1, 803.11, 198/867.08, 470.1, 644

(56) References Cited

U.S. PATENT DOCUMENTS

| | | | | |
|---|---|---|---|---|
| 2,249,666 | * | 7/1941 | Rapley et al. ..................... | 198/473.1 |
| 3,570,647 | * | 3/1971 | Meikle .............................. | 198/470.1 |
| 3,724,648 | * | 4/1973 | Schaller ............................ | 198/473.1 |
| 3,957,154 | * | 5/1976 | Shiba ................................ | 198/473.1 |
| 4,058,202 | * | 11/1977 | Reist et al. ......................... | 198/470.1 |
| 4,124,112 | * | 11/1978 | Mohney et al. .................. | 198/473.1 |
| 4,801,132 | * | 1/1989 | Reist ................................ | 198/470.1 |
| 4,968,081 | * | 11/1990 | Beight et al. ..................... | 198/470.1 |
| 5,029,695 | * | 7/1991 | Kovara .............................. | 198/473.1 |
| 5,169,139 | * | 12/1992 | Stauber et al. .................... | 198/470.1 |
| 5,251,888 | * | 10/1993 | Eugster ............................ | 198/803.11 |
| 5,388,820 | * | 2/1995 | Eberle et al. ..................... | 198/470.1 |

FOREIGN PATENT DOCUMENTS

| | | |
|---|---|---|
| 3143511A1 | 5/1983 | (DE) . |
| A20355971 | 2/1990 | (EP) . |
| 04-132059A1 | 2/1991 | (EP) . |
| 6-32448 A | * 2/1994 | (JP) .................................. 198/473.1 |

* cited by examiner

Primary Examiner—Douglas Hess
(74) Attorney, Agent, or Firm—Birch, Stewart, Kolasch & Birch, LLP (57) ABSTRACT

A star feeder (4) is arranged between a first and a second conveying device (1, 2) for conveying objects in series and it serves for transferring the objects (G) from the first conveying device (1) to the second conveying device (2). In order to make the star feeder adaptable to a wide range of different types of objects, the compartments (5) are all simultaneously adjustable regarding their form and/or their radial depth.

30 Claims, 7 Drawing Sheets

STAR FEEDER FOR TRANSFERRING OBJECTS FROM A FIRST CONVEYING MEANS TO SECOND CONVEYING MEANS

FIELD OF THE INVENTION

The invention is in the field of conveying technology and concerns a star feeder, which star feeder serves for transferring serially conveyed objects from a first conveying means to a second conveying means. With the aid of such a star feeder e.g. objects which are supplied in a substantially lying position are transferred to be conveyed away in a substantially hanging position.

DESCRIPTION OF THE BACKGROUND ART

For a transfer from a lying conveyance e.g. on a conveying belt to a hanging conveyance by means of e.g. individual grippers, the objects must not only be stood up, i.e. turned by 90°, but they must also be clocked and positioned in a highly precise manner. For carrying out such a transfer, a star feeder is a possible solution. A star feeder comprises compartments arranged at regular distances on the perimeter of a feeder wheel, which compartments have openings extending in axial direction. The star feeder is driven to rotate around a substantially horizontal axis. In a position on the perimeter of the feeder from where the compartments move upwards and have a more or less horizontal position (position 9 o'clock, if the feeder is rotating clockwise; position 3 o'clock if the feeder is rotating counter-clockwise), one of the objects supplied in a lying position is introduced into each compartment of the rotating star feeder. Each object has been rotated by about 90° when it has reached the topmost position (position 12 o'clock) where it can be gripped by gripping means to be removed from the compartment.

Of course, the application of star feeders for transferring serially conveyed objects is not restricted to the application between supply in a lying position and further conveying in a hanging position. A star feeder can e.g. also be used for transferring objects supplied in a hanging position and conveyed away in a lying position or for transferring between two lying conveyances, whereby the objects are turned by the star feeder such that their part oriented downstream on supply to the transfer is turned upstream when being conveyed away.

Operation of such star feeders causes little problems. However, for transferring the objects not only precise positioning is necessary but in particular for objects of small stiffness (e.g. bags of all kind) sufficient guiding within the compartments is necessary also. Therefore, the form of the compartments must be adapted to the objects to be handled. This means that for a change in object type the compartments must possibly be exchanged or the whole star feeder must be exchanged. This kind of adaptation is connected with a lot of effort concerning time and material and can only be prevented through a very restricted use of the star feeder.

SUMMARY OF THE INVENTION

It is the object of the invention to create a star feeder allowing changes in the type of objects to be handled without problems or in other words, being able to handle different types of objects within much broader limits without problems and without causing mechanical work.

The inventive star feeder comprises compartments which are adjustable together, i.e. the compartment depth (distance from the bottom of the compartment to the perimeter of the feeder) and/or the compartment form of all compartments can be adjusted with one mutual adjusting means. By adjusting the radial compartment depth, the star feeder is adjusted for different dimensions of objects to be transferred. This means that a change in the dimension of the objects to be transferred does no make it necessary to shift the complete star feeder and/or the first and second conveying means. By adjusting the form of the compartments these are adapted to different characteristics and different forms of objects to be handled.

Further scope of applicability of the present invention will become apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

BRIEF DESCRIPTION OF THE DRAWINGS

The inventive device is described in more detail in connection with the following drawings which are given by way of illustration only, and thus are not limitative of the present invention, and whereby.

DETAILED DESCRIPTION OF THE PREFERRED EMBODIMENTS

Figure 1:
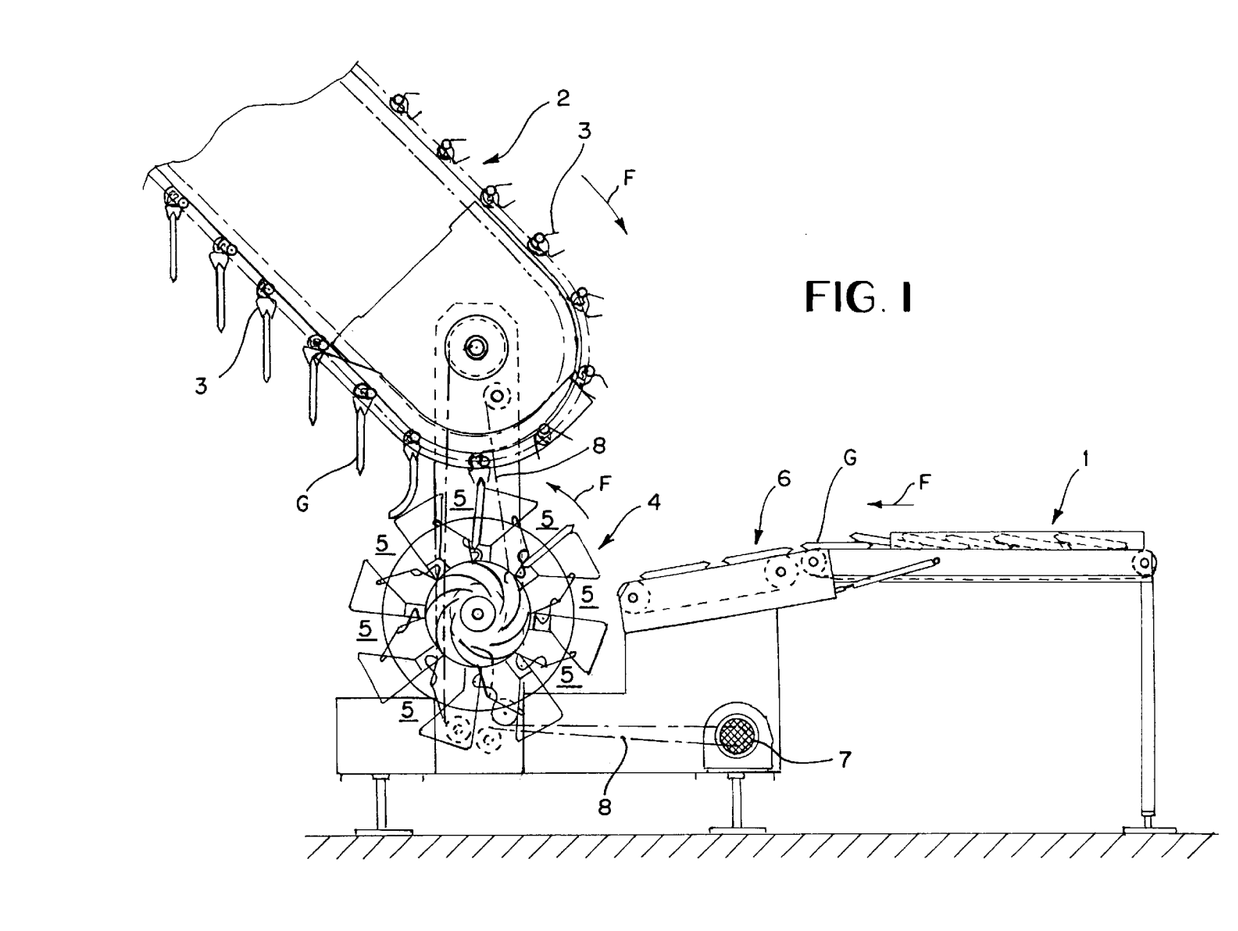
FIG. 1 shows the transfer of serially conveyed objects from a lying conveyance to a hanging conveyance with the help of an exemplified embodiment of the inventive star feeder which is arranged between a first and a second conveying means (viewing direction perpendicular to the conveying direction or parallel to the axis of the star feeder)

FIG. 1 shows in a general view, a transfer of objects G having the form of bags. The objects G are supplied in a substantially lying position (e.g. as a stream of objects partly overlapping each other) by a first conveying means 1, e.g. a conveying belt. From the first conveying means, the objects G are taken over by the star feeder 4 having e.g. eight compartments open towards the perimeter of the feeder, for being transferred to a second conveying means 2 having grippers 3 for conveying the objects away in a substantially hanging position. The star feeder 4 is arranged between the first and the second conveying means (1 and 2).

The conveying direction F of all three devices (first conveying means 1, second conveying means 2 and star feeder 4) are substantially in the same plane (plane of the paper in FIG. 1). The axis of the star feeder 4 is arranged perpendicular to this plane and substantially horizontal. The star feeder 4 is driven by a suitable drive (see further below) in counter-clockwise direction. The first conveying means 1 leads into the star feeder in a position of about 3 o'clock and the second conveying means is arranged such that the objects are gripped and moved out of the compartments 5 by the grippers in a position of about 12 o'clock.

For separating the objects from each other before being introduced into the compartments 5 of the star feeder 4 and possibly for synchronizing supply of the objects with the movement of the compartments, an intermediate conveying means 6 may be provided between the first conveying means 1 and the star feeder 4 which intermediate conveying means runs faster than the first conveying means 1 and is possibly adaptable with the help of sensor-means (not shown) to a non-continuous movement of the compartments 5 of the star feeder 4 by being switched on and off.

For driving the star feeder 4, e.g. a drive 7 is provided by which not only the star feeder 4 but also the second conveying means 2 with the grippers 3 are driven in precise synchronism via a chain or tooth belt (broken line 8).

The shown objects 3 are bags with protruding seams. This kind of bag is often used for packaging foodstuffs and consists e.g. of plastic film or metal/plastic film and has varying characteristics which influence its handling (e.g. stiffness, staying ability, specific gripping points). The bags shown in FIG. 1 are merely an example for objects that can be handled with the inventive star feeder.

Figure 2:
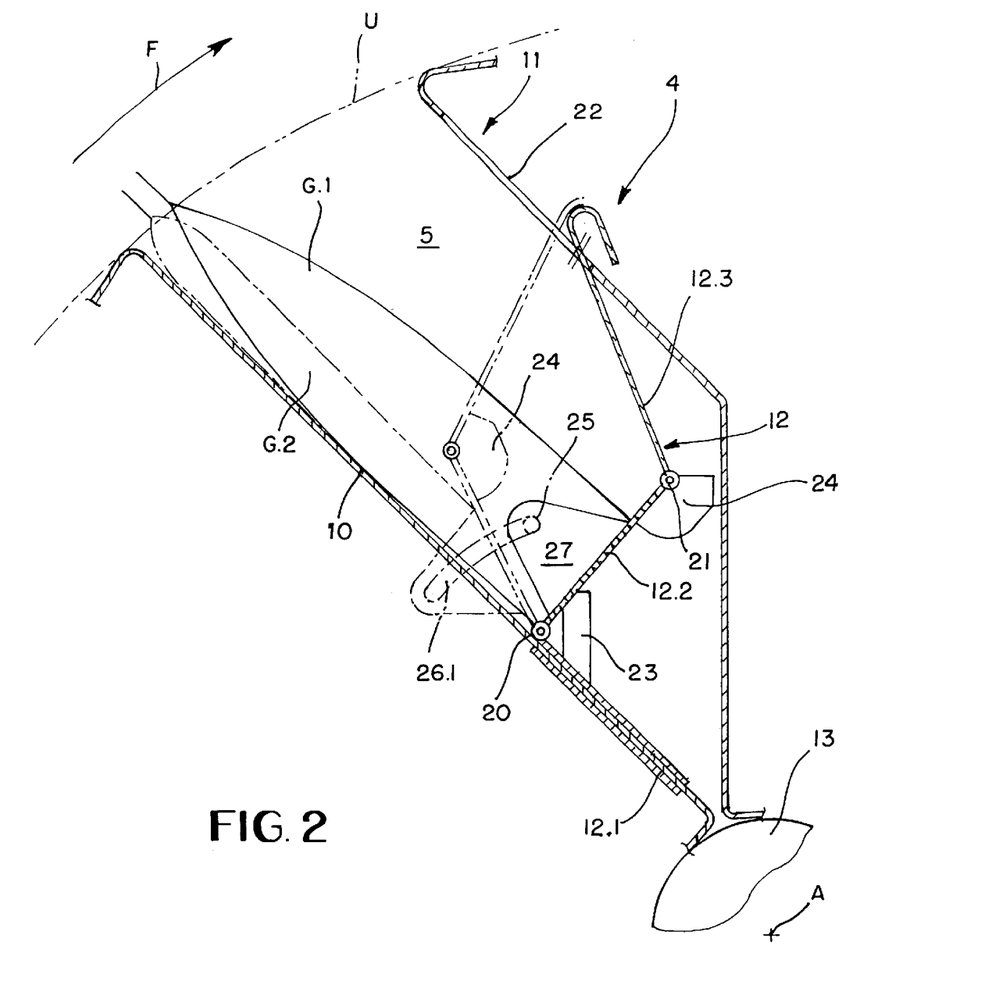
FIGS. 2 to 4 show different adjustments regarding form and depth of one compartment of the star feeder according to FIG. 1 (viewing direction parallel to the axis of the star feeder)
Figure 3:
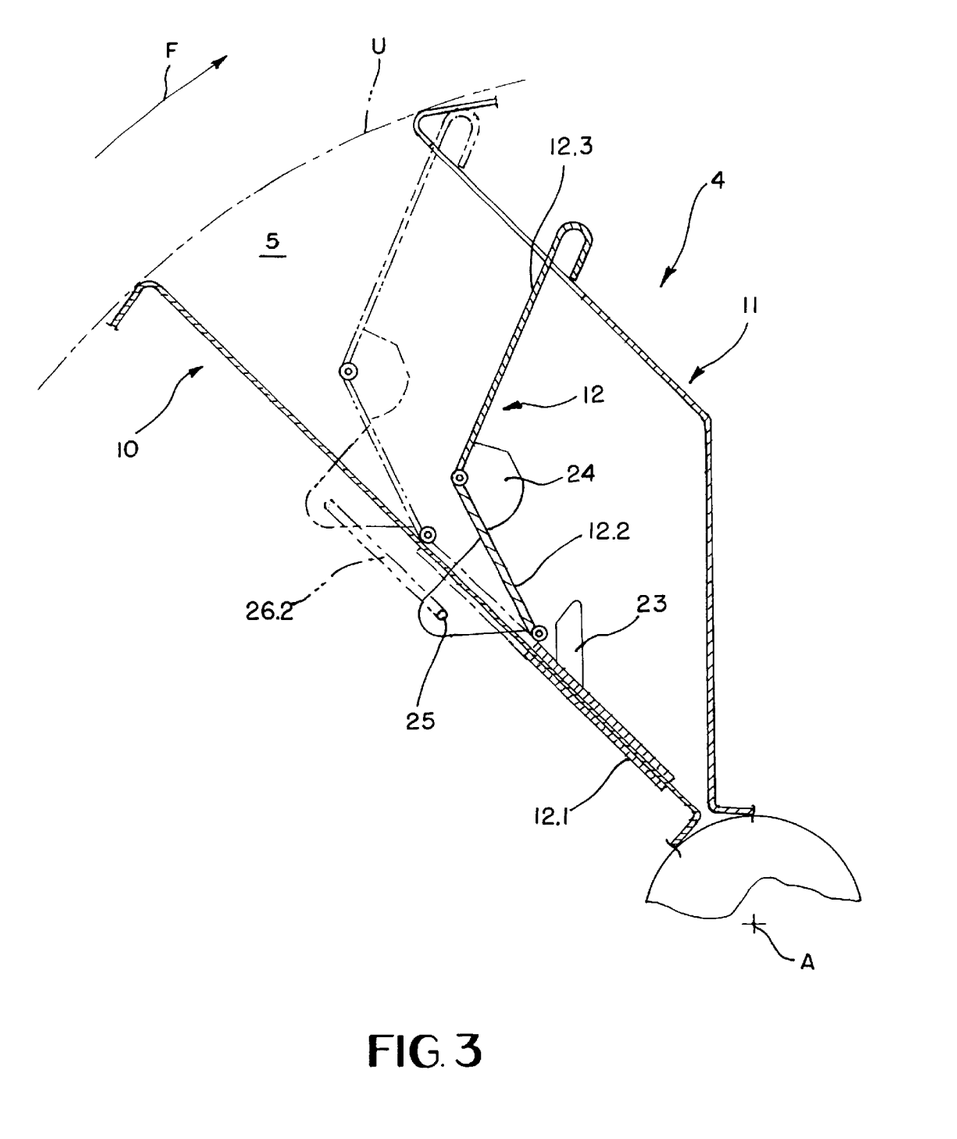
Figure 4:
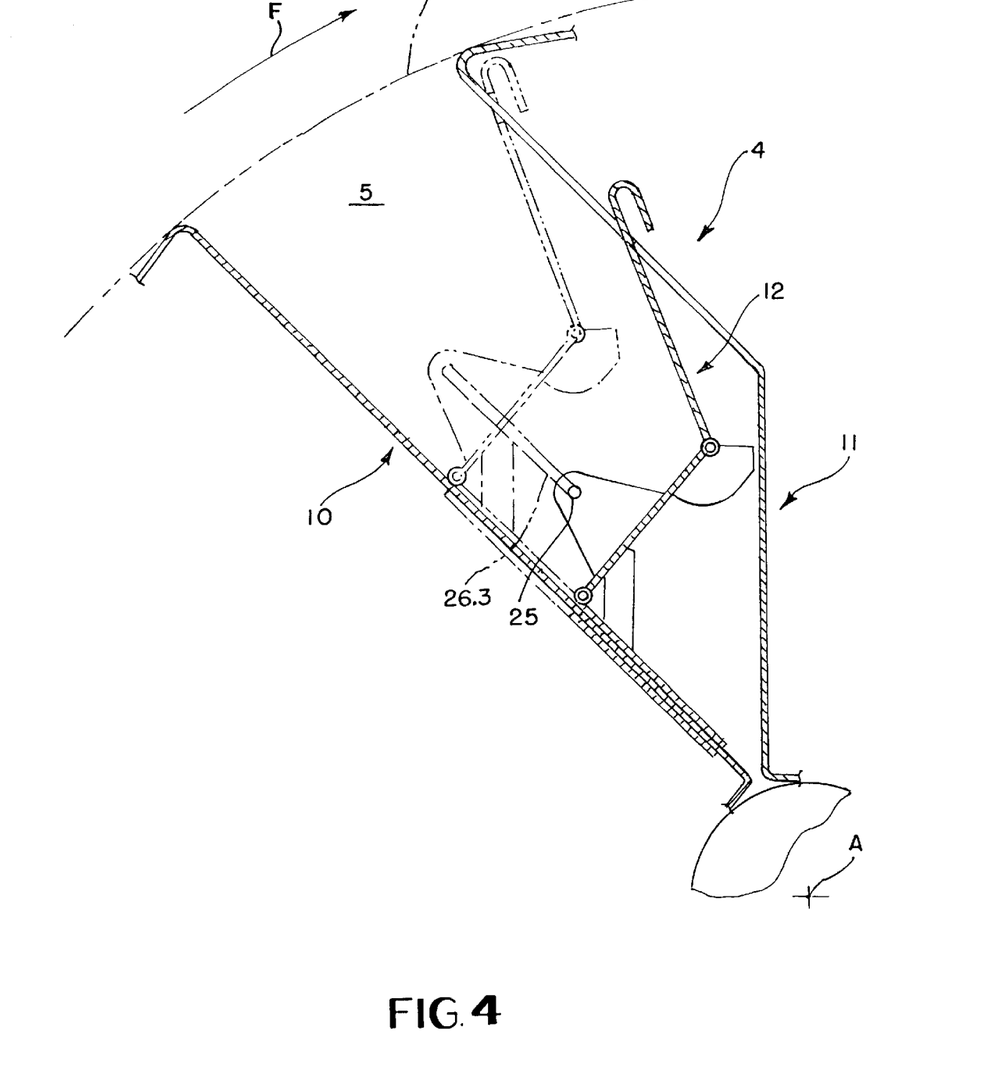

FIGS. 2 to 4 show the adjustable parts of one individual compartment 5 of a star feeder 4 as shown in FIG. 1. The star feeder is driven to rotate around the rotation axis A, in a direction which between the two conveying means corresponds to the conveying direction F. The circumference of the star feeder is designated with U. The compartment 5 is shown in a section perpendicular to the axis A.

The compartment 5 is formed by three walls 10, 11 and 12. Wall 10 is the upstream wall of the compartment and is stationary relative to the feeder axis. Wall 11 is the downstream wall and is also stationary. The two stationary walls 10 and 11 are fixed to the feeder shaft 13. Between the stationary walls 10 and 11 and connecting these, a deformable and/or displaceable, i.e. adjustable wall 12 is arranged, whereby the adjustment of the adjustable wall 12 is guided by the stationary walls.

FIG. 2 illustrates an adjustment of the form of the compartment by deformation of the adjustable wall 12 within the compartment 5. The adjustable wall 12 of the shown, exemplified embodiment comprises a first, a second and a third wall part 12.1, 12.2, 12.3 which wall parts are flexibly joined to each other by means of joints 20 and 21. The first wall part 12.1 is guided along the upstream wall 10, the third wall part 12.3 is guided pivotally in an opening 22 of the downstream wall 11. For restricting the pivotability of the wall parts 12.1, 12.2, and 12.3 against each other the guiding opening 22 is dimensioned correspondingly and limit stops 23 and 24 are provided.

Deformation of the wall 12 is effected with the aid of an adjusting means yet to be described which adjusting means acts on a form-control-pin 25. For adjusting the form of the compartment, the form-control-pin is displaced in a first control slot 26.1 arranged on a face plate of the star feeder (not shown). The form-control-pin 25 is arranged on a control part 27 which is rigidly connected to the second wall part 12.2.

The adjustable wall 12 is shown in FIG. 2 in two extreme positions. In unbroken lines, a position is shown in which the adjustable wall 12 or its second part 12.2 respectively forms a substantially right angle with the upstream wall 10, i.e. forms a floor within the compartment (right angled form of compartment). The adjustable wall 12 is held in this position by fixing the form-control-pin 25 in the corresponding position, by a first limit stop 23 upon which the second wall part 12.2 lies and by an opening 22 which defines the position of the third wall part 12.3. This wall position is especially suited for handling objects which have a base themselves and thus can stand by themselves. As an example of such an object, a stand-up bag G.1 is shown in the compartment 5.

Broken lines show a position of the adjustable wall 12 in which the second wall part 12.2 forms an acute angle with the upstream wall 10 (acute angled form of compartment). The adjustable wall 12 is held in this position by fixing the form-control-pin 25 in a corresponding position and by a second limit stop 24 on which the third wall part 12.3 lies. This kind of position of the adjustable wall 12 is especially suited for handling flat objects which have no ability to stand and/or require lateral guidance. As an example of this kind of object a flat bag G.2 is shown which bag has a protruding seam on its upper edge.

Wall positions between the right angled form and the acute angled form of the compartment (as shown in FIG. 2) can be realized also. As will be shown further below, the compartment depth in the shown embodiment cannot be adjusted for any intermediate form.

FIG. 3 shows the same compartment 5 as FIG. 2 and illustrates the adjustment of the compartment depth for the acute angled form of the compartment. For this kind of adjustment, the first wall part 12.1 of the adjustable wall 12 is displaced in radial direction along the stationary upstream wall 10, whereby the form of the adjustable wall 12 is retained due to the form-control-pin 25 being shifted in a corresponding second control slot 26.2 keeping the position of the second wall part 12.2 and the third wall part 12.3 still lying on the second limit stop 24. For the radial displacement of the adjustable wall 12, corresponding control means (not shown) are arranged on the first wall part 12.1 e.g. on its inner end which control means are functionally coupled to adjusting means yet to be described.

In FIG. 3, the adjustable wall 12 is shown again in two extreme positions: in unbroken lines in a position in which its distance to the axis A of the star feeder is the smallest and thus the compartment depth (distance from the circumference of the star feeder) is largest and in broken lines in a position in which the compartment depth is smallest.

FIG. 4 again shows the same compartment as FIGS. 2 and 3 and illustrates the adjustment of the compartment depth with a right angled compartment form. This adjustment is in principle the same as the adjustment of the compartment depth for the acute angled compartment form (FIG. 3), whereby the form-control-pin 25 is moved in a corresponding control slot 26.3 such that the compartment form is kept constant when the compartment depth is adjusted. Again, the position of the adjustable wall 12 for the deepest compartment is shown in unbroken lines and for the least deep compartment in broken lines.

If control the slots 26.2 and 26.3 for the form-control-pin 25 for adjusting the depth of the compartment 5 according to FIGS. 3 and 4 are provided only for the two extreme compartment forms (right angled and acute angled compartment form) depth adjustment is not possible for intermediate compartment forms as noted above.

Figure 5:
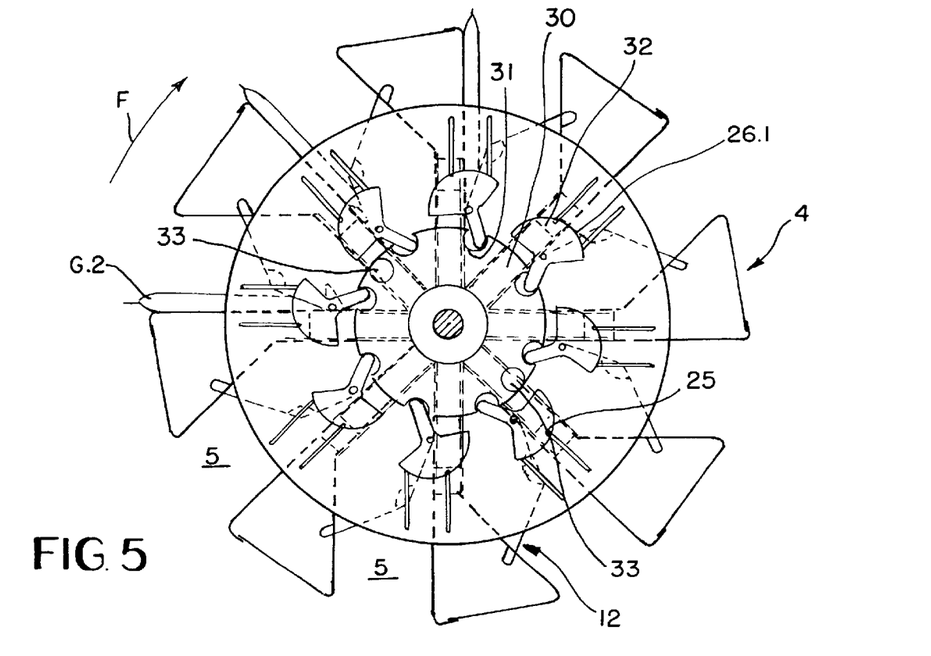
FIGS. 5 to 8 show exemplified adjusting means for the simultaneous adjustment of all compartments of the star feeder according to FIG. 1 (viewing direction parallel to the axis of the star feeder)
Figure 6:
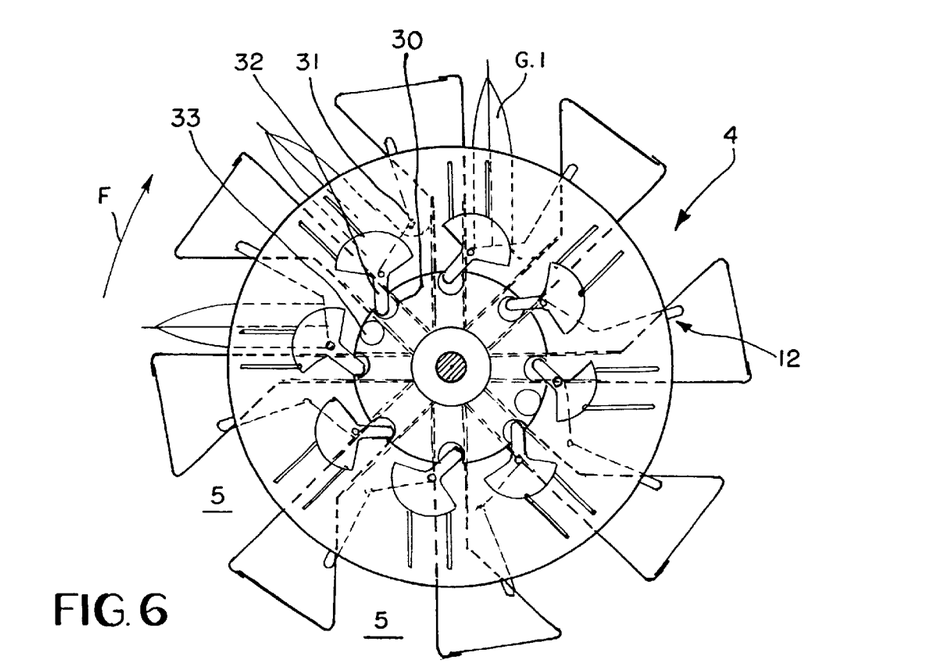

FIGS. 5 to 8 show exemplified adjusting means with which all compartments 5 of an inventive star feeder 4 are adjustable together regarding compartment form and/or compartment depth. The angle of view is again parallel to the axis of the star feeder 4, whereby FIGS. 5 and 6 show the one face of the star feeder 4 and FIGS. 7 and 8 the other.

FIGS. 5 and 6 show the mutual adjusting means for the form adjustment of all compartments 5 of the star feeder. This adjusting means is arranged on one face of the star feeder 4 and substantially consists of a form-control disc 30 arranged co-axially with the star feeder. The form-control disk has recesses 31 arranged regularly on its circumference and catching control levers 32 arranged pivotally on the star feeder, the control levers acting on the form-control-pins 25 of the adjustable walls 12, i.e. displacing them in the control slots 26.1. By rotation of the form-control-disc 30 relative to the star feeder 4 in counter-clockwise direction, the control levers 32 are rotated clockwise and from an acute angled compartment (FIG. 5) e.g. for flat bags G.2, a right angled compartment (FIG. 6) e.g. for stand-up bags G.1 is made. Obviously, setting an intermediate form is possible also. The form-control-disc 30 is fixed in the desired rotation position relative to the star feeder 4 with the help of locking screws 33.

Figure 7:
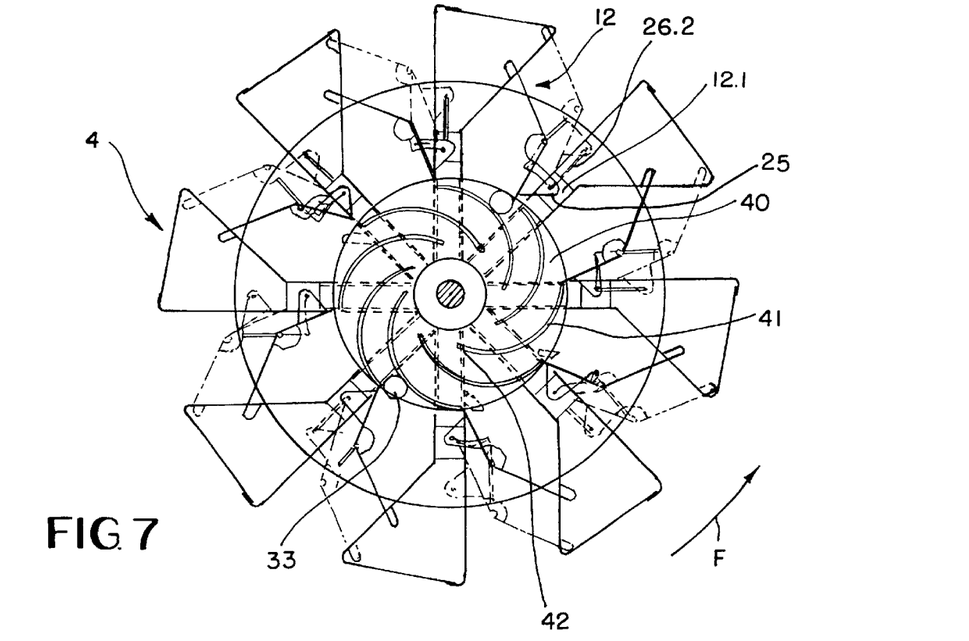
Figure 8:
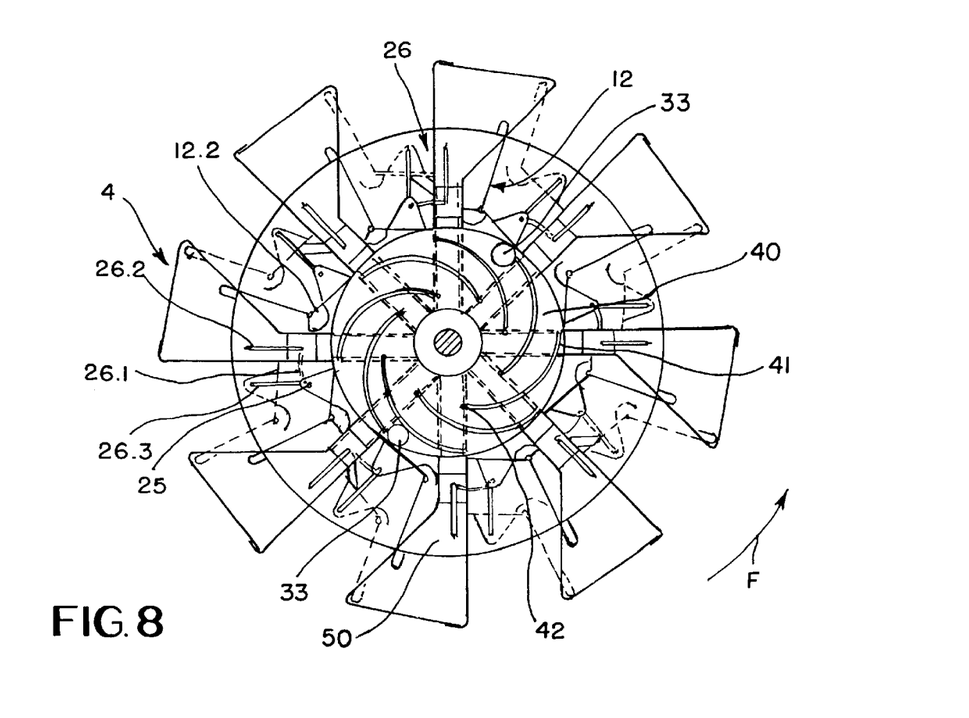

FIGS. 7 and 8 show the mutual adjusting means for simultaneous adjustment of the depth of all compartments of an inventive star feeder according to FIG. 1. For this adjustment a depth-control-disc 40 again arranged co-axially to the star feeder is provided on the face of the star feeder 4 opposite to the form-control-disc 30 (FIGS. 5 and 6). This depth-control-disc 40 comprises slots 41 arranged spirally in which slots the depth-control-pins 42 are displaceable in a guided manner which depth-control-pins 42 are mounted on the inner ends of the first wall parts 12.1 of the adjustable compartment walls 12.

Due to clockwise rotation of the depth-control-disc 40 relative to the star feeder 4, the depth-control-pins 42 guided in the control slots 41 are displaced radially outward and the compartment depth is reduced. The depth-control-disc 40 is fixed in the desired position relative to the star feeder 4 by means of locking screws 33.

FIG. 7 shows, for the acute angled compartment form, the deepest compartments in unbroken lines and the least deep compartments in broken lines. As mentioned before, intermediate positions are possible also. For adjusting the depth for the acute angled compartments the form-control-pins 25 are guided in the control slots 26.2 (see also FIG. 3).

FIG. 8 shows, for the right angled compartment form, the deepest compartments in unbroken lines and the least deep compartments in broken lines. As mentioned before, intermediate positions are possible also. For adjusting the depth of right angled compartments, the form-control-pins 25 are guided in the control slots 26.3 (see also FIG. 4).

From FIG. 8 the U-shaped slots 26 are clearly visible. These slots consist of control slots 26.1, 26.2 and 26.3 leading into one another and serve for guiding the form-control-pins 25. Also shown is a plate 50 in which these slots are arranged. This plate 50 is connected rigidly to the face of the star feeder.

It can easily be imagined that further parallel slots are arranged between the slots 26.2 and 26.3 serving for depth adjustment for intermediate compartment forms.

In order to adjust the inventive star feeder, firstly, the largest compartment depth is set by corresponding rotation of the depth control disc 40, causing the form-control-pins 25 to be positioned in slot 26.1 and enabling form adjustment. Then, the desired compartment form is set by corresponding rotation of the form-control-disc 30 and then the desired compartment depth is set by corresponding rotation of the depth-control-disc 40.

Figure 9:
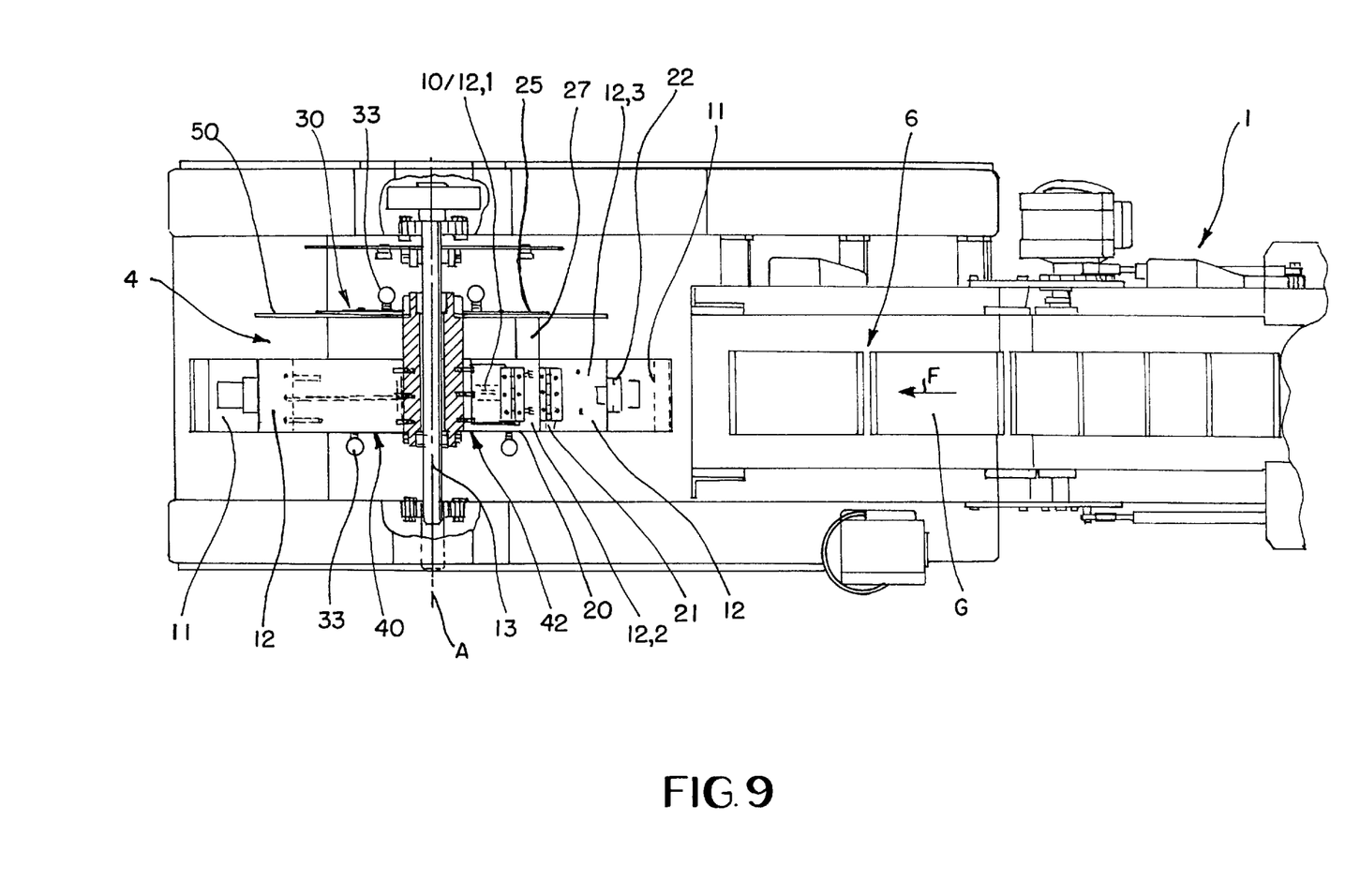
FIG. 9 shows a top view of the transfer arrangement according to FIG. 1 with an exemplified embodiment of the inventive star feeder.

FIG. 9 finally shows a top view of the arrangement previously shown in FIG. 1. Here, the second conveying means is not shown and the star feeder 4 is shown in section (horizontal section line) such that on the left hand side of the axis A of the star feeder 4 the walls 10, 11 and 12 of a compartment 5 can be seen from the inside of the compartment and on the right hand side from the outside.

From this Figure, the arrangement of the two control discs 30 and 40 on axially opposite sides of the star feeder 4 and the facial plate 50 can be seen. The form-control-disc 30 cooperates with the control parts 27 and the form-control-pins 25 and the depth-control-parts 27 cooperate with the depth-control-pins 42.

The axial extension of the compartment walls can, as is shown in FIG. 9, be smaller than the corresponding extension of the objects G to be handled. It may however be of the same size or larger. In any case, the axial position of the control discs 30 and 40 and of the facial plate 50 limit the axial width of the objects G to be handled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A star feeder for transferring serially conveyed objects from a first conveying device to a second conveying device, the star feeder comprises:

a plurality of compartments arranged regularly around a circumference of the star feeder and being open towards a circumference of the star feeder, all compartments of the star feeder having a same form and radial depth, the compartments having a stationary upstream wall, a stationary downstream wall and an adjustable wall which is at least one of deformable and displaceable, the adjustable wall connecting the two stationary walls, the adjustable wall including a plurality of wall parts which are pivotally joined to each other; and means for changing at least one of a form and depth of all compartments simultaneously for adaptation of the star feeder to transfer different types of objects.

2. The star feeder according to claim 1, further comprising a drive for rotating the star feeder around an axis.

3. The star feeder according to claim 1, wherein the means for changing includes a mutual form adjusting device and wherein all compartments of the star feeder comprise control means functionally coupled to the mutual form adjusting device.

4. The star feeder according to claim 3, wherein the mutual form adjusting device comprises a form control disc arranged coaxially to the star feeder and functionally coupled to the control means via control levers and at least restrictedly rotatable relative to the star feeder, whereby the control means are arranged on one of the wall parts of the adjustable wall.

5. The star feeder according to claim 4, wherein the control means include form control pins arranged on the adjustable wall, the form control pins being guided in control slots in a face plate connected rigidly to the star feeder.

6. The star feeder according to claim 3, wherein the control means include form control pins arranged on the adjustable wall, the form control pins being guided in control slots in a face plate connected rigidly to the star feeder.

7. The star feeder according to claim 1, wherein the means for changing includes a mutual depth adjusting device which adjusts radial depth of the compartments and wherein all compartments of the star feeder comprise control means functionally coupled to the mutual depth adjusting device.

8. The star feeder according to claim 7, wherein the control means includes depth control pins on the adjustable walls, the mutual depth adjusting device comprises a depth control disc on a face of the star feeder, the depth control disc being functionally coupled to the depth control pins by spiral control slots and being restrictedly rotatable relative to the star feeder.

9. The star feeder according to claim 8, further comprising further control slots on a face plate, the further control slots being for form control pins to keep the compartment form constant during adjustment of the compartment depth.

10. The star feeder according to claim 7, wherein the means for changing includes a mutual form adjusting device, the mutual form adjusting device comprises a form control disc arranged coaxially to the star feeder and wherein the form control disc is on one face of the star feeder and the depth control disc is arranged on the other face of the star feeder.

11. The star feeder according to claim 7, wherein the means for changing includes a mutual form adjusting device, the mutual form adjusting device comprises a form control disc arranged coaxially to the star feeder and wherein the form control disc and the depth control disc are fixable in desired rotation positions relative to the star feeder by locking screws.

12. The star feeder according to claim 1, wherein the compartments are sized such that the objects handled are bags.

13. A star feeder for transferring serially conveyed objects from a first conveying device to a second conveying device, the star feeder comprises:

a plurality of compartments arranged regularly around a circumference of the star feeder and being open towards a circumference of the star feeder, all compartments of the star feeder having a same form and radial depth; and means for changing at least one of a form and depth of all compartments simultaneously for adaptation of the star feeder to transfer different types of objects, the means for changing including a mutual form adjusting device and all compartments of the star feeder comprise control means functionally coupled to the mutual form adjusting device, each compartment having an adjustable wall formed from a plurality of wall parts and the mutual form adjusting device comprises a form control disc arranged coaxially to the star feeder and functionally coupled to the control means via control levers and at least restrictedly rotatable relative to the star feeder, whereby the control means are arranged on one of the wall parts of the adjustable wall.

14. The star feeder according to claim 13, further comprising a drive for rotating the star feeder around an axis.

15. The star feeder according to claim 13, wherein the compartments have a stationary upstream wall, a stationary downstream wall and the adjustable wall which is at least one of deformable and displaceable, the adjustable wall connecting the two stationary walls.

16. The star feeder according to claim 13, wherein the control means include form control pins arranged on the adjustable wall, the form control pins being guided in control slots in a face plate connected rigidly to the star feeder.

17. The star feeder according to claim 13, wherein the control means include form control pins arranged on the adjustable wall, the form control pins being guided in control slots in a face plate connected rigidly to the star feeder.

18. The star feeder according to claim 13, wherein the compartments are sized such that the objects handled are bags.

19. A star feeder for transferring serially conveyed objects from a first conveying device to a second conveying device, the star feeder comprises:

a plurality of compartments arranged regularly around a circumference of the star feeder and being open towards a circumference of the star feeder, all compartments of the star feeder having a same form and radial depth, each compartment having an adjustable wall formed from a plurality of wall parts; and means for changing at least one of a form and depth of all compartments simultaneously for adaptation of the star feeder to transfer different types of objects, the means for changing including a mutual depth adjusting device which adjusts radial depth of the compartments and wherein all compartments of the star feeder comprise control means functionally coupled to the mutual depth adjusting device, the control means including depth control pins on the adjustable walls, the mutual depth adjusting device comprising a depth control disc on a face of the star feeder, the depth control disc being functionally coupled to the depth control pins by spiral control slots and being restrictedly rotatable relative to the star feeder.

20. The star feeder according to claim 19, further comprising a drive for rotating the star feeder around an axis.

21. The star feeder according to claim 19, wherein the compartments have a stationary upstream wall, a stationary downstream wall and the adjustable wall which is at least one of deformable and displaceable, the adjustable wall connecting the two stationary walls.

22. The star feeder according to claim 19, further comprising further control slots on a face plate, the further control slots being for form control pins to keep the compartment form constant during adjustment of the compartment depth.

23. The star feeder according to claim 19, wherein the means for changing includes a mutual form adjusting device, the mutual form adjusting device comprises a form control disc arranged coaxially to the star feeder and wherein the form control disc is on one face of the star feeder and the depth control disc is arranged on the other face of the star feeder.

24. The star feeder according to claim 19, wherein the means for changing includes a mutual form adjusting device, the mutual form adjusting device comprises a form control disc arranged coaxially to the star feeder and wherein the form control disc and the depth control disc are fixable in desired rotation positions relative to the star feeder by locking screws.

25. The star feeder according to claim 19, wherein the compartments are sized such that the objects handled are bags.

26. A star feeder for transferring serially conveyed objects from a first conveying device to a second conveying device, the star feeder comprises:

a plurality of compartments arranged regularly around a circumference of the star feeder and being open towards a circumference of the star feeder, all compartments of the star feeder having a same form and radial depth; and means for changing at least one of a form and depth of all compartments simultaneously for adaptation of the star feeder to transfer different types of objects, the means for changing including a mutual depth adjusting device comprising a depth control disc which adjusts radial depth of the compartments and wherein all compartments of the star feeder comprise control means functionally coupled to the mutual depth adjusting device the means for changing also including a mutual form adjusting device, the mutual form adjusting device comprises a form control disc arranged coaxially to the star feeder and wherein the form control disc is on one face of the star feeder and the depth control disc is arranged on the other face of the star feeder.

27. The star feeder according to claim 26, further comprising a drive for rotating the star feeder around an axis.

28. The star feeder according to claim 26, wherein the compartments have a stationary upstream wall, a stationary downstream wall and an adjustable wall which is at least one of deformable and displaceable, the adjustable wall connecting the two stationary walls.

29. The star feeder according to claim 26, wherein the form control disc and the depth control disc are fixable in desired rotation positions relative to the star feeder by locking screws.

30. The star feeder according to claim 26, wherein the compartments are sized such that the objects handled are bags.

* * * * *